United States Patent
Ortiz Hernandez et al.

(10) Patent No.: US 10,518,665 B2
(45) Date of Patent: Dec. 31, 2019

(54) SHIELD FOR ATTACHMENT TO A SEAT BASE

(71) Applicant: FORD GLOBAL TECHNOLOGIES, LLC, Dearborn, MI (US)

(72) Inventors: Edgardo Fabricio Ortiz Hernandez, Estado de Mexico (MX); Francisco Javier Ferreira Yañez, Estado de Mexico (MX); José Alfredo Peregrina Loera, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 664 days.

(21) Appl. No.: 14/934,490

(22) Filed: Nov. 6, 2015

(65) Prior Publication Data

US 2017/0129374 A1    May 11, 2017

(51) Int. Cl.
*B60N 2/06* (2006.01)
*B60N 2/90* (2018.01)

(52) U.S. Cl.
CPC .................. *B60N 2/06* (2013.01); *B60N 2/90* (2018.02)

(58) Field of Classification Search
CPC .................................... B60N 2/44; B60N 2/06

USPC ...... 297/463.1, 218.3, 452.38, 354.12, 411.2
See application file for complete search history.

(56) References Cited

U.S. PATENT DOCUMENTS

| 4,244,612 | A | 1/1981 | Schurman |
| 4,998,772 | A | 3/1991 | Safran et al. |
| 5,007,682 | A | 4/1991 | Kuwabara et al. |
| 7,644,984 | B2 | 1/2010 | Chalhoub et al. |
| 8,757,702 | B2 | 6/2014 | Biebel et al. |
| 2007/0273195 | A1 | 11/2007 | Adragna et al. |
| 2010/0090515 | A1* | 4/2010 | Yamazaki ............... B60N 2/44 297/463.1 |
| 2012/0313408 | A1 | 12/2012 | Nagata et al. |

FOREIGN PATENT DOCUMENTS

JP    2013203218 A  * 10/2013

* cited by examiner

*Primary Examiner* — Syed A Islam
(74) *Attorney, Agent, or Firm* — Vichit Chea; King & Schickli, PLLC

(57) ABSTRACT

An apparatus is for use in connection with a side of a seat base including a mounting bracket. The apparatus includes a shield adapted for shielding the side of the seat base. The shield includes at least one strengthening rib forming at least a portion of a receiver for receiving at least a portion of the mounting bracket.

20 Claims, 5 Drawing Sheets

SHIELD FOR ATTACHMENT TO A SEAT BASE

TECHNICAL FIELD

This document relates generally to the vehicle arts and, more particularly, to a shield for attachment to a seat base of a vehicle.

BACKGROUND

A vehicle seat base is typically an assembly associated with a side shield in order to cover and protect underlying components. The typical approach involves establishing a connection using multiple attachment points with the seat structure, which can make the part difficult to locate. The side shield may also include an overmolding to create an attachment structure, which results in potentially undesirable demolding marks that can make for an unattractive appearance or require further processing to obscure.

This document relates to a feature to attach the bracket of the seat structure to the side shield. The feature would provide for easy and secure attachment of the side shield, which would be strengthened as a result. Manufacture of the side shield would also be facilitated, including by avoiding the creation of molding marks in the finished product.

SUMMARY

In accordance with the purposes and benefits described herein, an apparatus for use in connection with a side of a seat base including a mounting bracket is provided. The apparatus comprises a shield adapted for shielding the side of the seat base. The shield includes at least one strengthening rib forming at least a portion of a receiver for receiving at least a portion of the mounting bracket.

In one embodiment, the shield comprises a plurality of strengthening ribs forming the receiver. The plurality of strengthening ribs may comprise a first rib and a second rib extending generally transverse to the first rib. The second rib may be spaced from the first rib to form the receiver.

The first rib may include a guide surface adjacent to the receiver for guiding the portion of mounting bracket into the receiver. A third rib may extend generally transverse to the first rib. The second and third ribs may be spaced from first rib to form the receiver, and may be attached to a common wall of the shield. The second rib may be provided on a first side of the first rib and the third rib may be on a second side of the first rib, the second and third rib contacting different walls of the shield. The ribs may be adapted to allow for the shield to be removed from a mold in a single direction.

A plurality of projections may be provided for guiding the mounting bracket into the receiver. The projections may each include a guide surface for guiding the portion of the mounting bracket into the receiver. A vehicle may include any apparatus described herein.

According to a further aspect of the disclosure, an apparatus comprised of a seat base including a mounting bracket having a projection and a shield adapted for shielding a side of the seat base is provided. The shield may include a plurality of strengthening ribs adapted for guiding the projection into position for attaching the shield to the seat base. The guide may include a plurality of guide surfaces for guiding the projection into a mounted position for connecting the shield to the seat base.

Yet a further aspect of the disclosure pertains to an apparatus for use in connection with a side of a seat base including a mounting bracket. The apparatus comprises a shield adapted for shielding the side of the seat assembly. The shield includes a plurality of walls, each wall being connected to at least one strengthening rib. At least two of the ribs are spaced apart for at least partially receiving the mounting bracket of the seat assembly.

The walls may form a recess in the shield, the recess including the plurality of strengthening ribs. The ribs may include at least one rib extending from a first wall to a second rib and a third rib extending from a second wall toward the second rib, with the space being formed between the second rib and the third rib. A fourth rib may be spaced from the second rib and generally parallel to the third rib.

The following description depicts and describes several embodiments of the shield for a vehicle seat, and the base in particular. As should be realized, the shield is capable of other, different embodiments and its several details are capable of modification in various, obvious aspects all without departing from the shield as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification illustrate several aspects of the side shield and together with the description serve to explain certain principles thereof.

Figure 4:
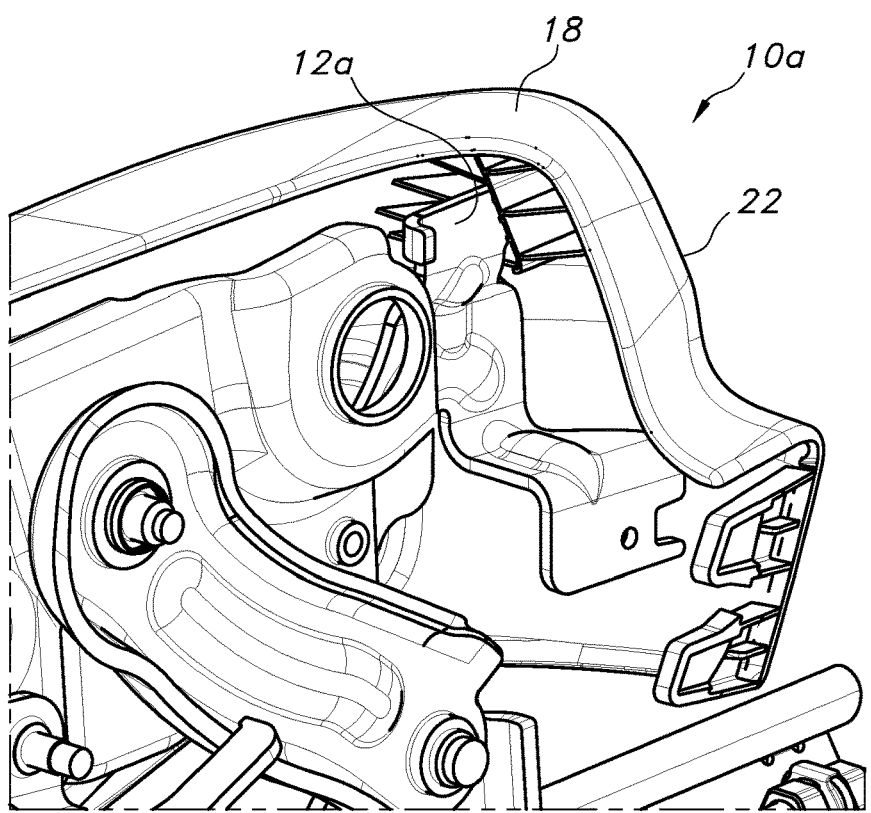
Figure 6:
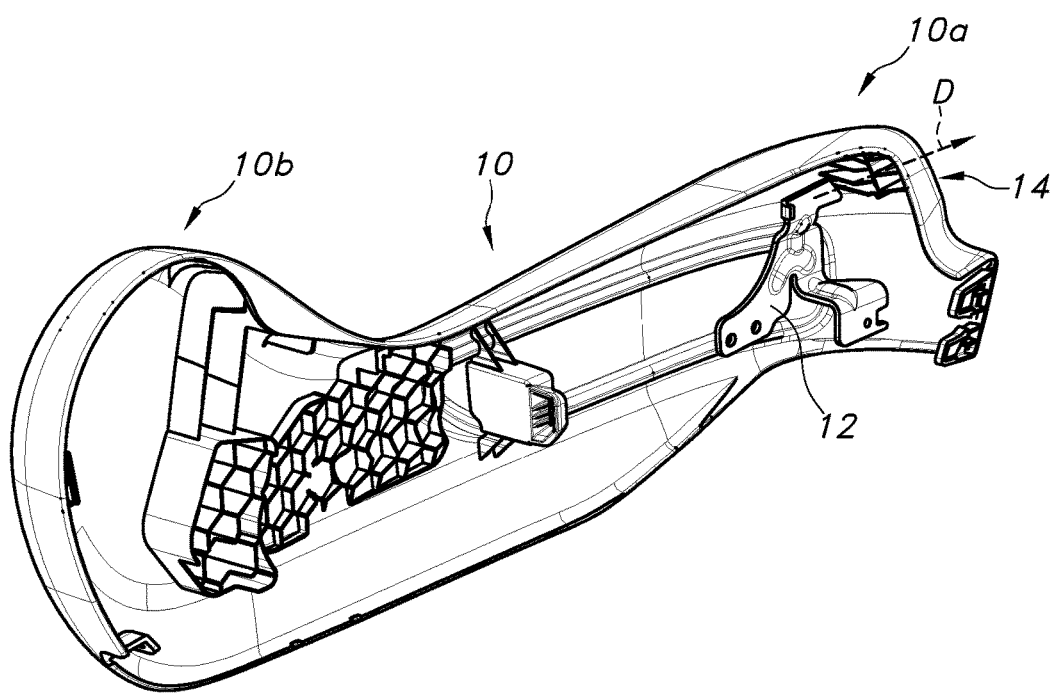
Figure 7:
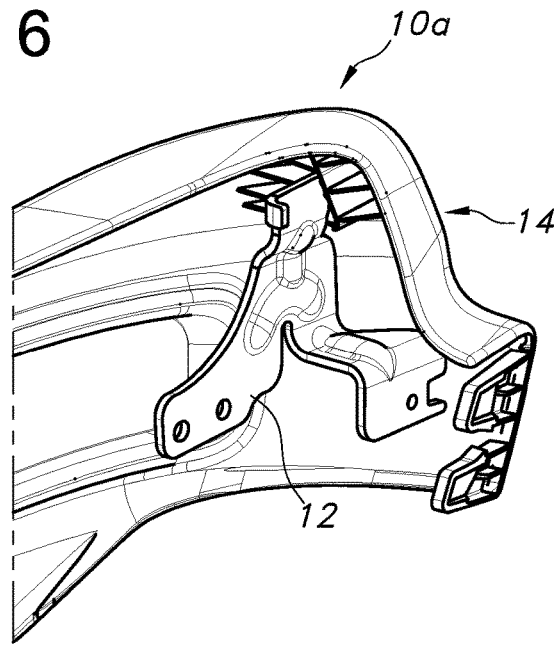
Figure 5:
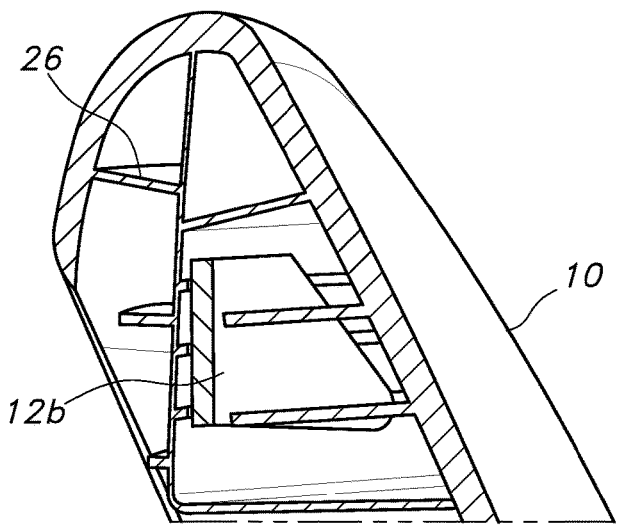
Figure 8:
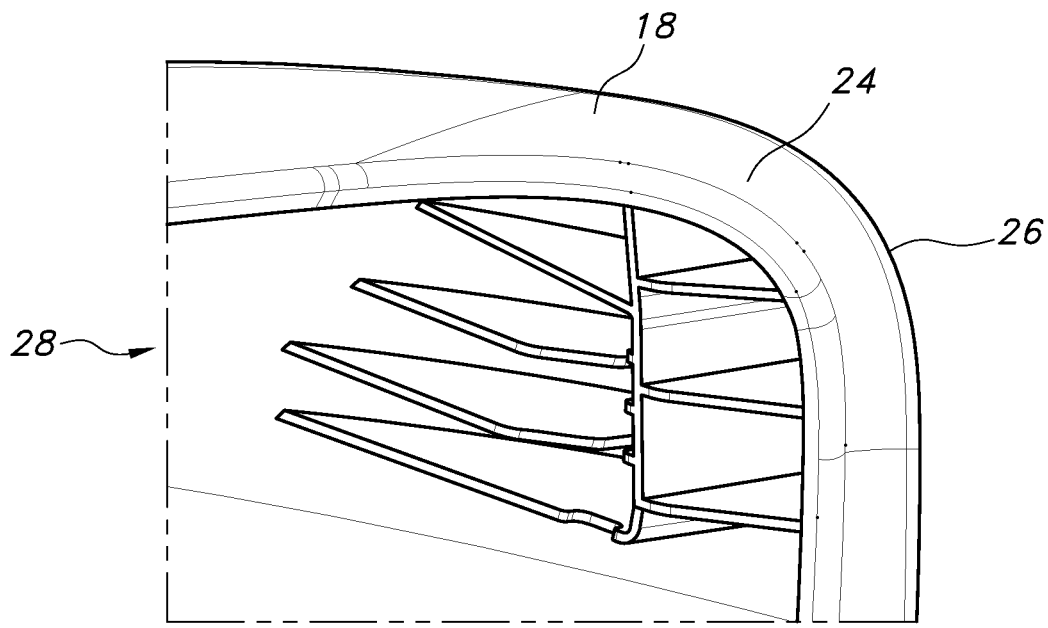
Figure 9:
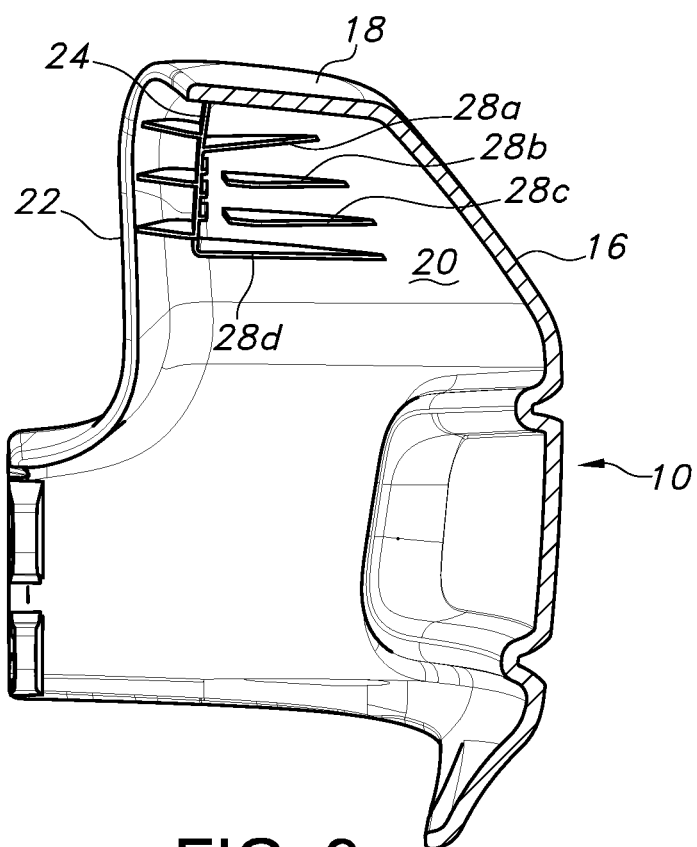
Figure 9A:
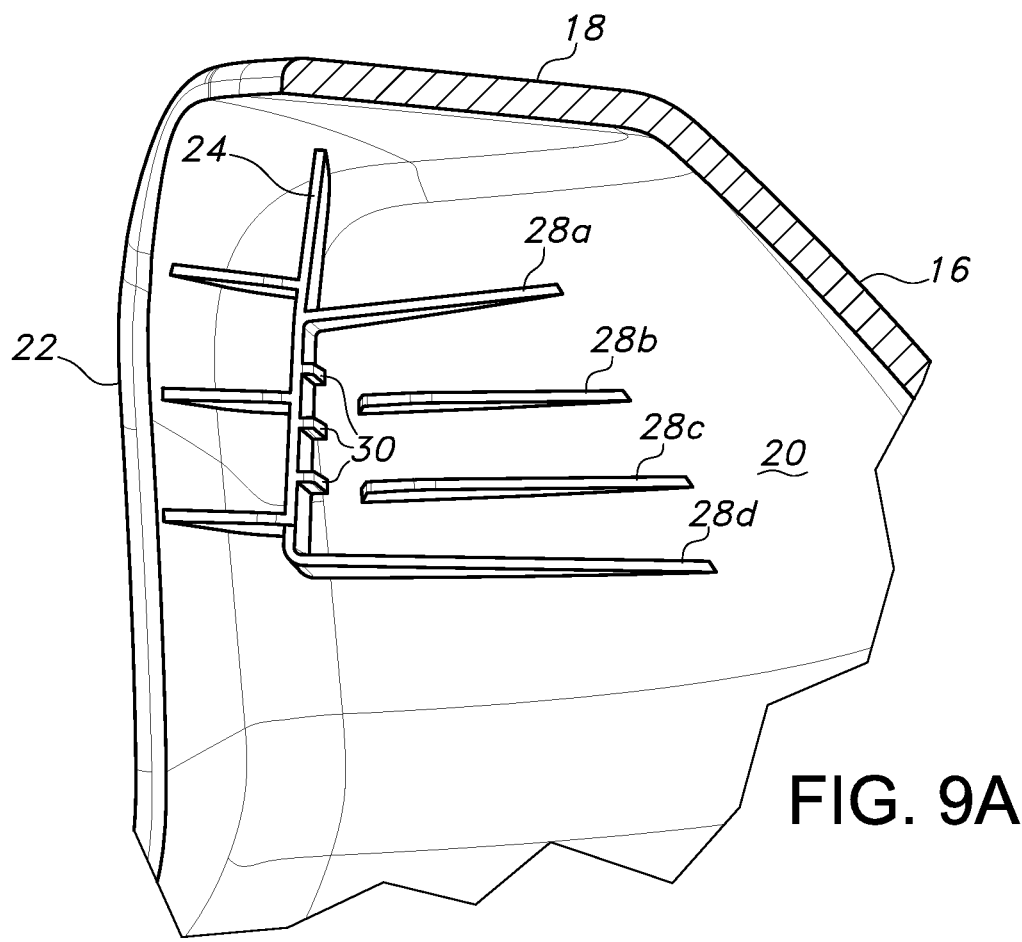

FIGS. 4, 5, and 7 are partially cutaway, close up perspective views showing the receiver interfacing with a mounting bracket of the seat base;

FIG. 8 is a close up perspective view showing one arrangement of strengthening ribs forming the receiver associated with the side shield;

FIG. 9 is a cross-sectional side view of the receiver;

FIG. 9a is an enlarged view of the structure of FIG. 9; and

Figure 10:
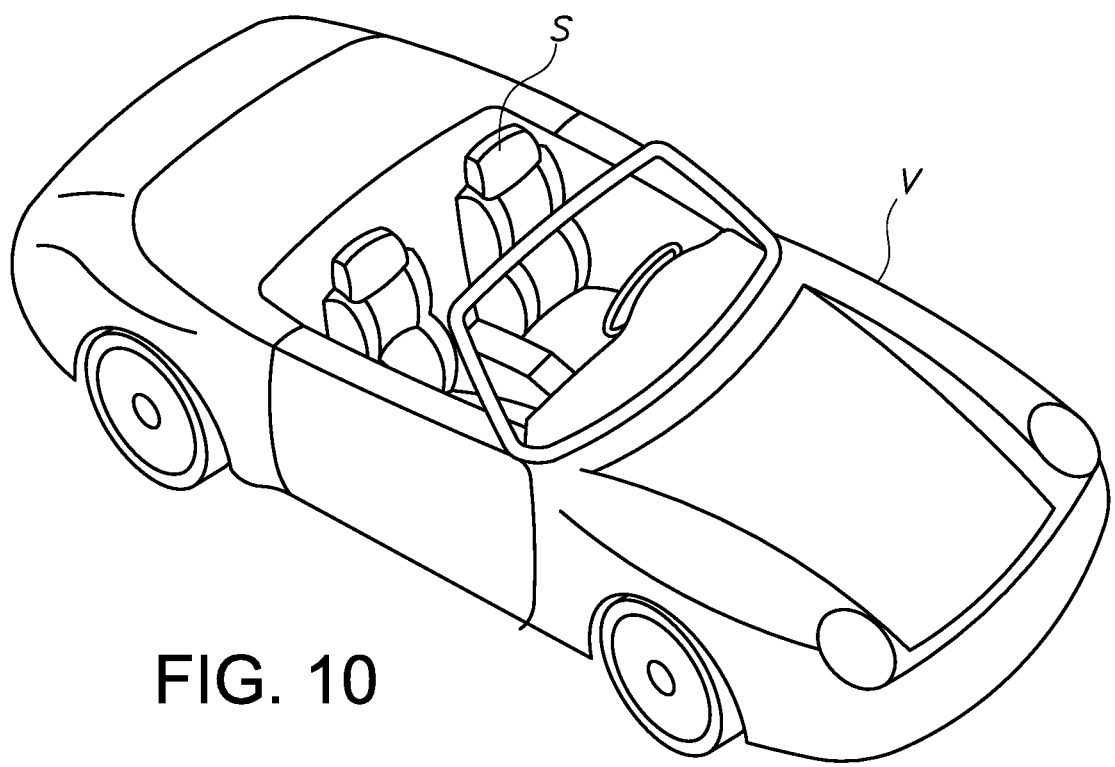

FIG. 10 illustrates a vehicle to which aspects of the disclosure may have applicability.

Reference will now be made in detail to the present preferred embodiments of the storage unit, examples of which are illustrated in the accompanying drawing figures.

DETAILED DESCRIPTION

Figure 1:
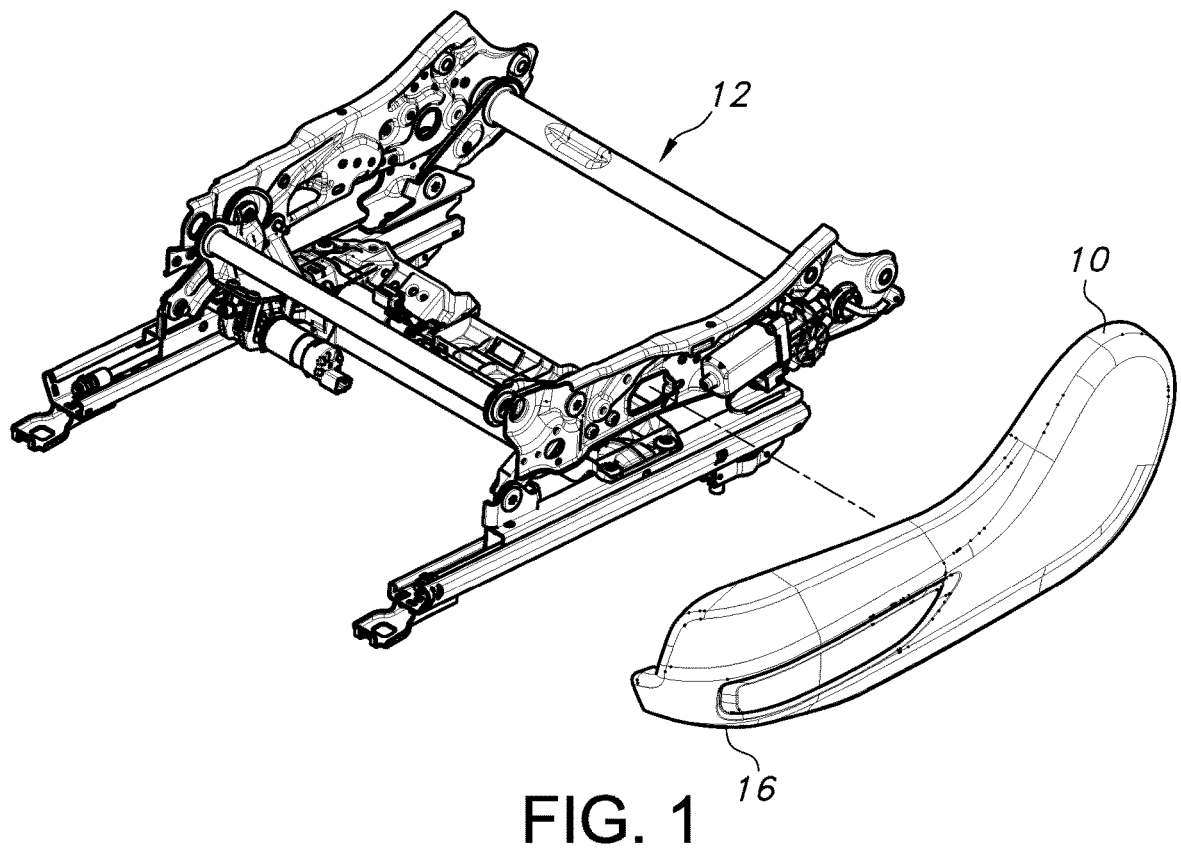
FIG. 1 is an exploded view of a seat structure, such as a base, and the side shield.
Figure 2:
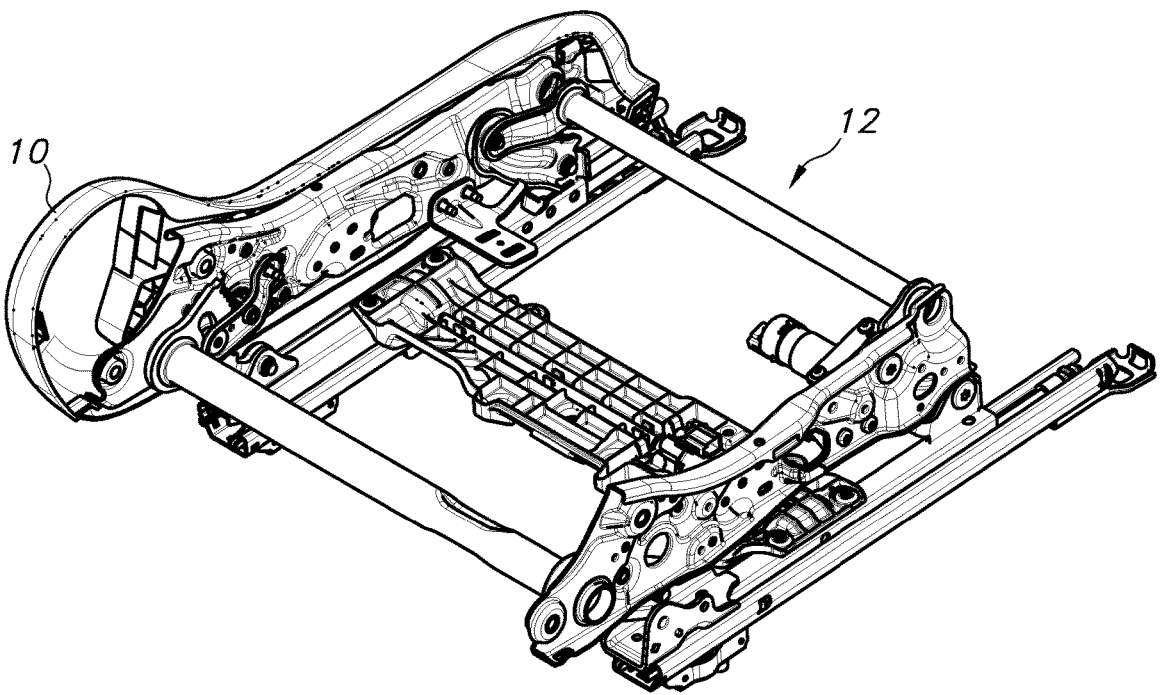
FIG. 2 is a perspective view of the seat assembly.

Reference is now made to FIGS. 1 and 2, which illustrate a cover or shield 10 for attachment to a side of a base 12 associated with a seat S, such as in a vehicle V (see FIG. 10). The seat base 12 may support a seat S for receiving a person in the vehicle while seated, and may include various mechanisms (e.g., motors, levers, linkages) for making adjustments to the position or orientation of the seat S. The side shield 10 is provided to at least partially shield these mechanisms or other parts of the assembly or base 12 underlying the seat S from external interference, and also to provide an aesthetically pleasing (e.g., color matched) appearance for the vehicle interior. The shield 10 is shown as being elongated and having a particular shape, with a relatively narrow first end 10a and an oversized second end 10b and, but as should be appreciated, it may take any form as desired to cover any portion or all of the side of the seat base 12.

Figure 3:
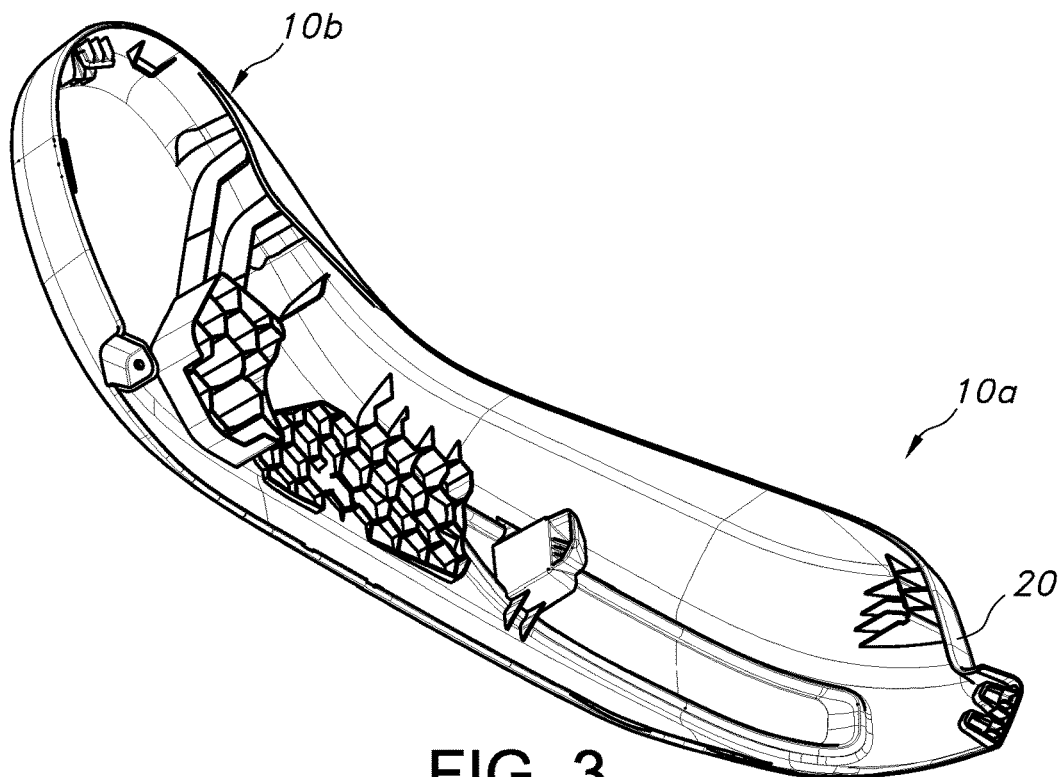
FIGS. 3 and 6 are perspective views of the side shield in one embodiment.

With reference to FIGS. 3-5, it can be understood that a mounting bracket 12a may form part of the seat base 12, and may be the structure to which the shield 10 is attached in use. Specifically, and with further reference to FIGS. 6-9, it can be understood that the shield 10 may include a receiver 14 adapted for receiving a portion of the bracket 12a, such as a tongue 12b, which may be generally oriented in the vertical direction in use. The receiver 14 may be provided along any portion of the shield 10, but in the illustrated embodiment is provided in a recess or compartment formed along the first end, between a front wall 16, a top wall 18, a side wall 20, and a rear wall 22.

In accordance with one aspect of the disclosure, the receiver 14 may be formed by one or more strengthening ribs used to provide rigidity to the shield 10. In the illustrated embodiment, the strengthening ribs include a first, generally vertical rib 24, termed a "main" rib simply for purposes of clarity and not to imply that it is any more or less important in terms of providing strength to the shield structure. This main rib 24 may be attached to and extend between the sidewall 20 and the top wall 18. Along one side (the front, in use), one or more generally transverse forward ribs 26 (three shown, but more or fewer may be provided) connect the front wall 16 with the rib 24. The forward ribs 26 may also connect with a portion of the side wall 20, as perhaps best understood from FIG. 9, and may be generally perpendicular to the main rib 24.

Along the opposite side of the main rib 24, and perhaps understood with reference to FIGS. 5 and 9, one or more transversely extending rear ribs 28 are also provided. These rear ribs 28 at least partially form the receiver 14 for receiving the portion of the mounting bracket 12. In the illustrated embodiment, the rear ribs 28 include four ribs, but any number may be provided. The rear ribs 28 may also be generally perpendicular to the main rib 24.

As can be understood with reference to FIG. 9, two of the rear ribs 28 (such as the upper and lower ribs 28a, 28d) may connect with the main rib 22, and also the sidewall 20. However, the middle or intermediate ribs 28b, 28c, which are shown as being connected to the end wall 20, are spaced from the main rib 22. These ribs 28b, 28c thus create a gap or space partially forming the receiver 14 for receiving the portion 12a of the mounting bracket 12 when the two structures are associated.

As can be appreciated from FIGS. 4, 5, 6, and 7, this receiver 14 formed by the ribs 24, 28b, 28c thus provides a guide for guiding the shield 10 to the correct mounted position in association with the mounting bracket 12a to ensure that the seat base 12 is mounted in the correct position without significant effort or analysis. Specifically, the portion of the bracket 12a, such as tongue 12b, is guided to the correct position in the gap formed between the ribs 24 and 28a-28d. When in the mounted condition, the arrangement is such that the receiver 14 prevents relative movement of the shield 10 in the forward or aft direction (which is transverse to the insertion direction D), as well as in a direction opposite the direction of insertion (FIG. 6), yet does not interfere with movement in this direction (at least to a depth corresponding to the proper seated condition of the tongue 12b). While a secure connection is thus established, it is also fully releasable in order to allow for the shield 10 to be removed, such as for servicing the seat base 12.

FIG. 9a illustrates also that one or more guide structures 30 may also be provided for assisting in guiding the mounting bracket 12 into position. The guide structure 30 may comprise elongated projections (three shown), which extend along the main rib 24 in the direction of insertion or removal of the portion of the bracket 12. Regardless of form, the structure 30 may provide surfaces along which the portion, such as tongue 12a, is guided during insertion, and may also lend strength to the main rib 24.

The opposing faces of the ribs 28b, 20c bounding the receiver 14 may also be tapered in a direction transverse to the direction of insertion D, and thus form guide surfaces for the portion (tongue 12b) of the mounting bracket 12a. Consequently, the mouth of the receiver 14 is wider than the terminal end. This facilitates insertion of the portion of the mounting structure, such as the tongue 12b.

The shield 10 may be formed of various materials or methods, including by injection molding a plastic material or resin. As can be appreciated, the structure of the ribs 24, 26, 28 in the illustrated embodiment allows for an arrangement to be created in which full and easy withdrawal of the part in one direction relative to an injection mold can be achieved. Furthermore, because the receiver 14 is fully contained within a recess of the shield 10, and thus hidden from view in use, the presence of molding marks on external surfaces may be avoided.

In summary, a shield 10 for use in connection with a seat base 12 is provided, which provides several advantages and perhaps others that have yet to be discovered. For one, the shield 10 takes advantage of the presence of one or more strengthening ribs 24, 26, or 28 to provide a secure mounting arrangement, and one that can be manufactured integrally with the shield structure without extraordinary complexity or effort. The presence of external mold markings may also be avoided by providing the receiver 14 in connection with the ribs 24, 26, or 28, which are internal to the shield 10. The ribs 24, 26, 28 thus perform the dual function of not only strengthening the part (shield 10), but also providing for its secure mounting, which is a novel approach to side shield mounting arrangements.

The foregoing has been presented for purposes of illustration and description. It is not intended to be exhaustive or to limit the embodiments to the precise form disclosed. For example, although a mounting bracket 12a with a projection (tongue 12b) having a major dimension in a vertical direction is shown, the projection could instead have a major dimension in a different direction, such as generally horizontal, with the receiver 14 being adjusted accordingly (but still formed by at least one of the strengthening ribs). Hence, the term "bracket" is not used herein to connote any particular shape of structure, and may take various forms without limitation. Obvious modifications and variations are possible in light of the above teachings. All such modifications and variations are within the scope of the appended claims when interpreted in accordance with the breadth to which they are fairly, legally and equitably entitled.

What is claimed:
1. An apparatus, comprising:
    a seat including a seat base having a lateral side with a mounting bracket projecting transversely therefrom;
    a shield adapted for shielding the lateral side of the seat base, the shield including a recess having at least one strengthening rib forming at least a portion of a receiver for receiving at least a portion of the mounting bracket.
2. The apparatus of claim 1, wherein the shield comprises a plurality of strengthening ribs forming the receiver.

3. The apparatus of claim 1, wherein the plurality of strengthening ribs comprise:
a first rib; and
a second rib extending generally transverse to the first rib.

4. The apparatus of claim 3, wherein the second rib is spaced from the first rib to form the receiver.

5. The apparatus of claim 3, wherein the first rib includes a guide surface adjacent to the receiver for guiding the mounting bracket.

6. The apparatus of claim 3, further including a third rib extending generally perpendicular to the first rib.

7. The apparatus of claim 6, wherein the second and third ribs are spaced from first rib to form the receiver.

8. The apparatus of claim 6, wherein the second and third ribs are attached to a common wall of the shield.

9. The apparatus of claim 3, wherein the second rib is on a first side of the first rib and a third rib is on a second side of the first rib, the second and third ribs contacting different walls of the shield.

10. The apparatus of claim 3, wherein the ribs are adapted to allow for the shield to be removed from a mold in a single direction.

11. The apparatus of claim 1, wherein the shield includes a plurality of projections for guiding the portion of the mounting bracket into the receiver.

12. The apparatus of claim 11, wherein the plurality of projections each include a guide surface for guiding the portion of the mounting bracket into the receiver.

13. A vehicle including the apparatus of claim 1.

14. An apparatus, comprising:
a seat base including a mounting bracket having a projection; and
a shield adapted for shielding a side of the seat base, the shield including a plurality of strengthening ribs adapted for guiding the projection into position for attaching the shield to the seat base.

15. The apparatus of claim 14, further including a plurality of guide surfaces for guiding the projection into a mounted position for connecting the shield to the seat base.

16. A vehicle including the apparatus of claim 14.

17. An apparatus for use in connection with a side of a seat base including a mounting bracket, comprising:
a shield adapted for shielding the side of the seat base, the shield including a plurality of walls, each wall being connected to at least one strengthening rib, and at least two of the ribs being spaced apart for at least partially receiving the mounting bracket of the seat base.

18. The apparatus of claim 17, wherein the walls form a recess in the shield, the recess including the plurality of strengthening ribs.

19. The apparatus of claim 18, wherein the ribs include at least one rib extending from a first wall to a second rib and a third rib extending from a second wall toward the second rib, with the space being formed between the second rib and the third rib.

20. The apparatus of claim 19, further including a fourth rib spaced from the second rib and generally parallel to the third rib.

* * * * *